METHOD OF MAGNETIC FLAW DETECTION USING A RECORDING LAYER THAT IS HEATED AND COOLED IN THE LEAKAGE FIELD OF THE TESTPIECE

Filed Nov. 3, 1965

INVENTORS:
JOACHIM GREINER, FRIEDRICH KRONES
BY Connolly and Hutz
Their Attorneys

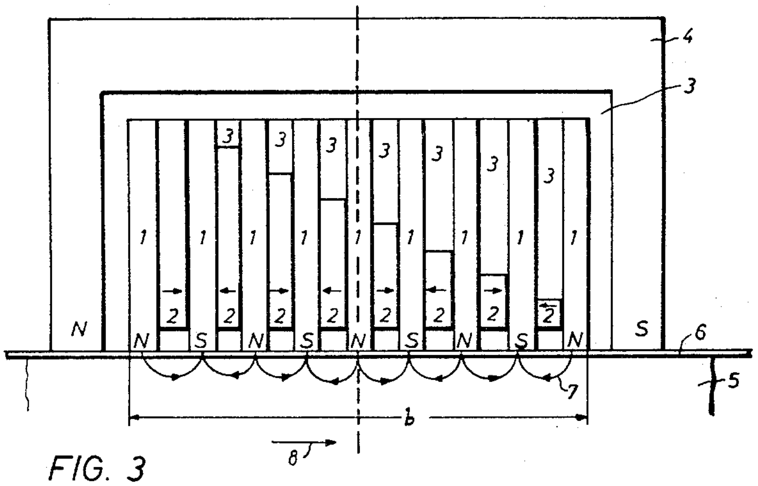
FIG. 3
FIG. 4.a
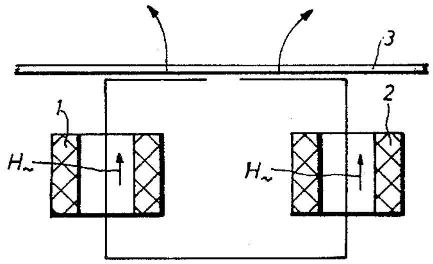
FIG. 4b
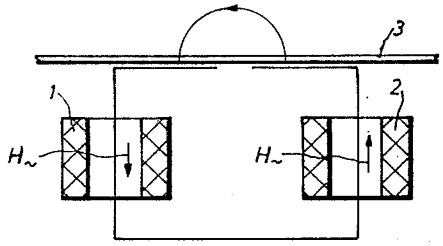
INVENTORS:
JOACHIM GREINER, FRIEDRICH KRONES
BY
Connolly and Hutz
their Attorneys United States Patent Office 3,430,133

Patented Feb. 25, 1969

3,430,133

METHOD OF MAGNETIC FLAW DETECTION USING A RECORDING LAYER THAT IS HEATED AND COOLED IN THE LEAKAGE FIELD OF THE TESTPIECE

Joachim Greiner and Friedrich Krones, Leverkusen, Germany, assignors to Agfa-Gevaert Aktiengesellschaft, Leverkusen, Germany, a corporation of Germany Filed Nov. 3, 1965, Ser. No. 506,203
Claims priority, application Germany, Dec. 8, 1964, A 47,813
U.S. Cl. 324—37 2 Claims
Int. Cl. G01r 33/12

ABSTRACT OF THE DISCLOSURE

Testing of magnetizable objects for flaws with magnetic recording layer, gives better results when recording layer has a coercive force about equal to the field strength at the magnetic saturation knee of the object tested. Recording layer coercive force can be larger in which case alternating magnetic field is used to reduce that force to desired value. Testing can also be carried out by heating recording layer above Curie temperature, applying it to the object to be tested, and then cooling the layer to below Curie temperature.

Figure 1:
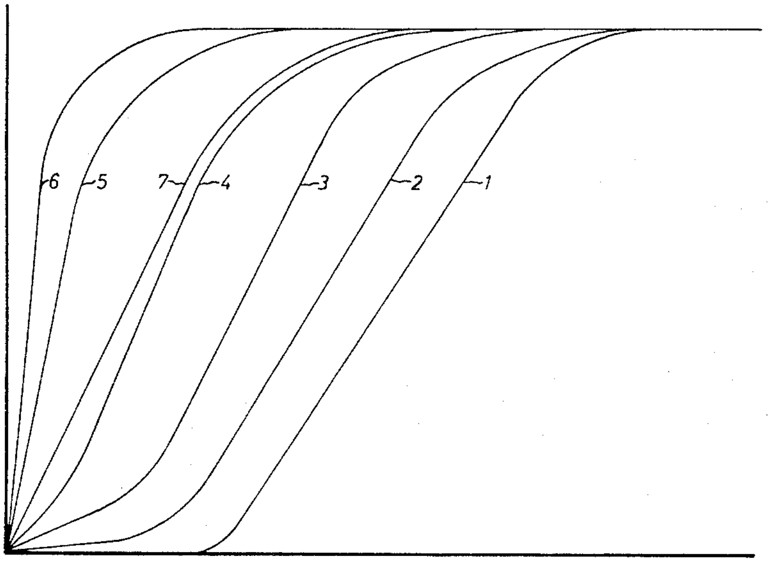

This invention relates to an improvement in the known magnetographic process of using a magnetizable foil, e.g., in tape form, to locate faults in magnetic workpieces.

One of the most modern methods of testing materials is the known magnetographic process. In this process, the surface of the workpiece to be tested is covered with a magnetizable foil. The scatter field which is produced at the fault when the specimen being tested is magnetized, is reproduced on this magnetizable foil and then scanned and indicated by the known processes. The following are examples of suitable indicating processes:

(1) A magnetic induction process such is customarily employed nowadays in magnetic sound instruments.

(2) Measurement of the magnetic flux, e.g., by (a) Scanning devices with Hall elements, (b) Scanning devices operating by the overtone (second harmonic) process (Foerster probes, slit probes), (c) Devices having variable magnetic resistance.

(3) Magnetic powder processes, e.g., by means of the known Bitter strip technique or by so-called solubilizing processes. In the latter case, a foil in which magnetic particles are embedded in soluble materials (e.g. magnetic tape based on cellulose) is used for reproducing the scatter field of the test specimen. When the soluble materials are dissolved, the magnetizable particles can orientate themselves according to the magnetic field, and unextinguishable evidence of the area of fault is obtained on the foil.

(4) A magneto-optical process (Kerr or Faraday effect).

The known tape-shaped magnetic storing devices which consist either of a magnetizable layer (pigments or continuous metal layers) arranged on a suitable support or, in the form of the so-called mass tapes, do not satisfy the requirements of this process, especially with regard to their magnetic properties. The special features of the magnetographic process require recording cariers which must have qualities that are unusual in this field of technology. Magnetically this is due to the unusually small intensity of the field strengths of the faults that have to be measured. For example, any more deeply lying fault or discontinuity is almost impossible to measure with the usual tapes, but the measurement of these deep faults is just as important as the measurement of surface discontinuities such as cracks or tears.

It is among the objects of the present invention to provide materials and methods for detecting faults or discontinuities in magnetizable metal workpieces by magnetographic processes. We now have found that the magnetographic process can be improved if the measurement of the magnetic stray fields of the faults is performed with magnetic recording members which have during the measurement a coercive force $H_{MC}$ substantially equal to the field strength $H_K$ in the saturation break or knee of the hysteresis loop of the workpiece to be tested.

The above condition can be met by using either a magnetic recording member the magnetizable layer of which initially has the above coercive force or by adjusting the coercive force, of the magnetizable layer to the desired values under the effect of idealizing conditions. Generally the coercive force has to be lowered to meet the foregoing condition.

The field strength at which the magnetizable layer shows a significant increase in magnetization under idealizing conditions, is termed $H_{MCi}$ and will hereinafter be called the quasi coercive force.

The field strength in the saturation break or kink of the hysteresis loop of the workpiece being tested depends on the type of material of which the workpiece is made Although many usual materials have similar properties in this respect, so that it would be possible to produce a magnetizable layer the coercive force of which initially meets the above condition, such a magnetic recording member generally would not be applicable.

According to a preferred embodiment of the present invention, the magnetographic process is performed in such a way that idealizing conditions prevail during the measurement and cause the coercive force of the magnetic foil to be shifted in such a way that the condition mentioned above is met. This removes all the problems of adapting the magnetic recording element and it is possible to use for all workpieces a type of magnetic recording material, the properties of which can be adapted in the desired manner to the magnetic properties of the workpiece as a result of the idealizing conditions.

In the case of test specimens which are not uniform in their magnetic structure, for example, in the case of hardened work pieces, the values to be chosen for $H_K$ are those corresponding to the hardening layer which is to be tested magnetically.

Due to the idealizing conditions, the sensitivity of the magnetic recording material can be fully utilized because its range of sensitivity is then adapted to the remanence which is to be measured in the scatter field of the fault The idealizing conditions can be achieved by the following measures:

(1) Application of an additional magnetic alternating field;

(2) Heat treatment;

(3) Application of a magnetic alternating field with simultaneous heat treatment.

According to the method mentioned under 1, the magnetizable layer of the magnetic recording member is first saturated by the alternating magnetic field. The alternating field and the direct magnetic field which produces the scatter field of the faults can then be left to attenuate slowly, either successively or simultaneously. A completely ideal remanent magnetization of the magnetizable layer is achieved especially if first the idealizing alternating field is choked and only thereafter the direct magnetic field. If the two fields die down simultaneously, the effect is less marked. The idealizing effect of the alternating field is always present, regardless of the angle between direct and alternating field.

If in the course of magnetization by the alternating field the operating curve has its saturation break at $H_{MIK}$ as a result of the idealizing conditions, then the direct magnetic field $H_P$, which produces the scatter field of the fault and to which the magnetizable layer is exposed due to magnetization of the test specimen, must be smaller.

$$H_P \leq H_{MIK}$$

One advantage of the process of the invention resulting from the idealizing conditions is that it is possible to select $$H_P \leq H_{MIK}$$

in accordance with the requirement of the measurement and consequently the magnetization apparatus for the test specimen, which is in some cases very expensive, can be reduced considerably.

Another advantage of the process is that different characteristic curves of partially ideal magnetization can be obtained by varying the strength of the direct and the alternating field.

FIGURE 1 illustrates that as a result of the idealizing conditions it is possible to obtain characteristic curves which lie between the remanence curve 1 and the curve of ideal magnetization 6. This means that the magnetic foil can easily be adapted to the properties of the workpiece to be tested by correct selection of the amplitude of the alternating field. As a result of this the faults can be determined within a wider range and at the same time the accuracy of measurement is increased. In addition, the noise level can be suppressed. In the case of relatively powerful alternating fields (curve 7), another advantage which results from this type of magnetization is the approximately linear relationship between the scatter field to be measured and the magnetization of the magnetizable layer. According to the invention, the surface roughness of the specimen can be effectively measured with the ideal or partially ideal magnetization. The use of the ideal or partially ideal magnetization has the further advantage that the disturbing noises caused by irregularities of magnetizable layer is greatly reduced. Much smaller direct fields are required for magnetizing the workpiece to be tested than in the known processes. This will be explained with the aid of the following example:

A tube is to be tested for cracks in its surface. For this purpose, a current is passed through a conductor extending along the axis of the tube. The field of this current should just saturate the outer layer of the tube so that the scatter field produced shall be as strong as possible. Now the magnetizable layer pressed onto the surface of the tube is subjected to the same field strength. If the coercive force of the magnetizable layer is smaller than that of the test specimen, the foil will be practically saturated. The scatter field cannot be recorded on the magnetizable layer. However the operating conditions are favourable when $H_{MC}$ is approximately equal to or only slightly greater than $H_K$.

In order to achieve the idealizing conditions in the above mentioned case, a direct current for producing the magnetic field which indicates the faults by magnetic scatter fields and an idealizing alternating current are produced along the axis of the tube to be tested. The alternating current is intended to adjust the coercive force of the magnetizable foil to the desired level. Under these conditions, the direct current can be kept considerably lower due to the ideal magnetization.

In the embodiment described above, the test specimen and foil were magnetized as a whole. It is also possible, however, for only small regions of the test specimen and the magnetizable layer to be magnetized ideally or partially ideally. Magnetic yokes or special arrangements of permanent magnets are used for this purpose. The technical expenditure is considerably less than in cases where the whole workpiece has to be magnetized.

Figure 2:
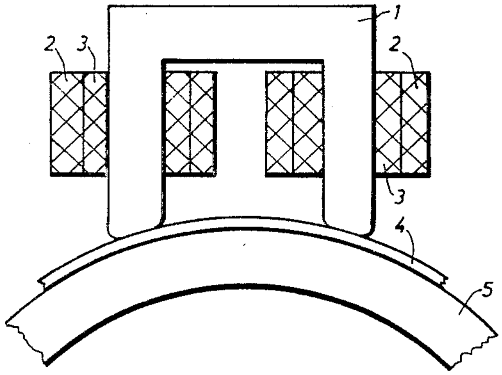

FIGURE 2 shows as example a magnet yoke 1 with coils 2 and 3. This arrangement magnetizes the foil 4 and tube 5. A direct current flows through the coil 2 to produce the scatter field which indicates the faults, and an idealizing alternating current flows through the coil 3. The operating conditions are again so chosen that the alternating field largely saturates the workpiece to be tested and the magnetizable layer but in any case modulates the magnetizable layer to above the coercive force $H_{MC}$. The direct field then saturates the test specimen as far as possible but has little influence on the magnetic foil.

Two methods of procedure can be employed in the case of magnetization with the yoke:

(1) The yoke is set up on the test specimen, the current is switched on, and then first the idealizing alternating field and then the direct field, or both together, are adjusted to zero. The foil is thereby ideally or partially-ideally magnetized. The whole specimen is scanned in this way.

(2) The yoke, through which the direct and alternating current flows, is passed over the magnetizable layer and test specimen, and the magnetizable layer is thus magnetized partially ideally.

The process according to the invention can be carried out particularly advantageously with arrangements of permanent magnets which have an external field which in one direction has an alternating polarity and gradually diminishing intensity.

FIGURE 3 shows such an arrangement which will be termed a magnetic carpet. This figure shows permanent magnets 2 which gradually decrease in height, with the result that the external scatter field 7 becomes weaker in the direction of the arrow 8. 1 indicates soft magnetic rails by means of which the flux produced by the permanent magnets is conducted to the surface. A magnet 4 extending over the carpet produces a direct field. The residual space is filled up with non-magnetic material 3. According to the invention, this magnetic arrangement can also be made of magnetic rubber. The advantage is that the rubber can be better adapted to the shape of the test specimen. If such an arrangement is passed over the magnetizable foil 6 placed on the test specimen 5, the scatter field of the fault is reproduced on the magnetizable foil.

It is also possible to use arrangements in which the yoke 4 is rotated through 90° about the dash-dot centre line with respect to the soft magnetic rail.

The width of the carpet should be overlapped by the yoke on both sides, so that when the arrangement passes across the magnetizable foil on the test specimen, magnetization is substantially ideal.

In the process indicated in FIGS. *4a* and *4b* for determining scatter fields with an overtone (second harmonic) probe, a split probe is passed over the surface of a test specimen which has been magnetized with a direct field. This split probe was hitherto connected in such manner that the premagnetizing alternating field in the coils 1 and 2 of the probe had the same direction (FIG. *4a*). The premagnetizing field is not closed over the gap. The induction coils were connected in such a manner that no voltage was indicated without the action of a scatter field to be measured.

It is also possible to proceed in such a manner that the test specimen is covered with the magnetizable layer and magnetized with a direct field and the scatter fields are scanned with a split probe during the action of the direct field. In that case, the coils 1 and 2 for premagnetization of the split probe are connected in such a manner that an approximately closed magnetic circuit results, with the result that a powerful field leaves through the gap of the probe where it causes an increase in the magnetization of the magnetizable foil 3.

The course of the field lines of the split probe are indicated schematically in FIG. *4b*. In this case, the magnetizable material of the magnetic recording member and the construction of the split probe are adjusted to each other so that the maximum of sensitivity of the magnetizable material and probe just equal to each other. The induction coils are so connected that zero is again indicated when there is no action from the field. The magnetizable layer is magnetized ideally or partially ideally by removing the probe from the test specimen or by adjusting the premagnetism field to zero. Compared with the procedure described above, this test procedure has the advantage that in addition to indicating faults instantaneously, it provides a magnetic recording member of relatively high magnetization as a record.

Compared with the method of magnetizing the magnetizable layer ideally and scanning it, the procedure just described has the advantage that indication of faults and ideal magnetization now takes place in a single step instead of in two steps. Although the fault is indicated immediately, the magnetic recording member can be examined again later.

In the case of the idealizing heat treatment, the magnetizable layer is heated above its Curie point and is left to cool on the surface of the entirely or partially magnetized test specimen. Idealization of the magnetization process is thereby achieved, and the scatter field of the test specimen is recorded on the magnetizable layer. The advantage of this idealization method lies in its high magnetic sensitivity and in the fact that the idealizing conditions are achieved with much simpler means.

In this method, the magnetic recording element is cooled in the scatter field of the test specimen from a temperature which is higher than or equal to the Curie temperature of the magnetizable material contained in the magnetizable layer. Depending on the properties of the magnetizable material with respect to its Curie point, many different temperatures may be required.

In the case of magnetic recording tapes which contain magnetizable pigments dispersed in a binder, it is, of course, only possible to heat to temperatures below the decomposition points of the binding agent of the magnetizable layer. It is therefore necessary to select magnetizable materials the Curie temperatures of which lie below the decomposition temperature of the binding agent, i.e., in the temperature region of about 30–200° C., preferably 80–120° C. Ferromagnetic chromium dioxides are especially suitable for use as magnetizable materials.

Such products have been described in German Patent 1,152,932 and French Patent 1,407,333.

To achieve the idealizing conditions, it is sufficient to heat the magnetic recording tape with the magnetizable layer alone, but in some cases it may be advantageous to heat both the workpiece and the magnetic tape.

The first mentioned variation of the process is explained with the aid of the following example:

The magnetic recording element is heated in a temperature chamber, where it can be wound on a spool or can be in the form of an endless band. It leaves the temperature chamber through a narrow slot just before the test specimen. The magnetizable layer is now pressed onto the test specimen and cools down to the temperature of the surroundings. Since the test specimen is magnetized as a whole or in localized areas in known manner by current or by permanent magnets, the faults have a scatter field, which is then recorded on the magnetizable layer during the cooling process. Due to the excellent magnetic idealization, this heat treatment results in a high remanent magnetization of the magnetizable layer. Since the thermal capacity of the common magnetic recording tapes is very small, the Curie temperature of the test specimen is not critical.

Many workpieces will be examined in the hot state due to the particular manner in which they are produced, and it frequently is necessary to detect faults and discontinuities before the workpiece has cooled down. In such cases, the workpiece may be magnetized while it is still hot without having to heat the magnetic recording tape separately. The magnetizable layer can then be pressed onto the workpiece and the whole arrangement left to cool. Ideal magnetization of the magnetizable layer is thereby obtained. In the idealizing heat treatment, heating and cooling of the magnetic recording tape may, of course, be effected by different methods. The type of heating employed is generally not critical and can be adapted to the particular conditions. This principle of this recording process by idealizing heat treatment has been described in Belgian patent specification 660,323.

Measuring of the recorded scatter field of the faults can be carried out in the usual manner.

EXAMPLE

An iron rail 20 x 5 mm. in cross section and of length about 1.50 metres has a fault in the form of a saw cut situated in the centre and about 1 mm. in depth. The iron has a coercive force of about 100 oe. A conventional commercial magnetic recording tape the magnetizable layer of which has a thickness of 12 m$\mu$ and a coercive force of 300 oe. was placed on this iron rail. A tape of this kind is described in Example 2 of British patent specification 979,527.

The iron rail is magnetized by means of two ceramic hard magnets of dimensions 50 x 5 x 15 mm. which are held about 55 mm. apart. They are passed over the rail and the tape at a distance of about 5 mm., a field strength of about 100 oe. acting along the surface in the centre of the permanent magnet assembly. After magnetization, the magnetic tape is glued together to form a loop and it is played back on a magnetic tape recorder (e.g., at a tape speed 9 cm. per second). The voltage of the playback head is amplified and reproduced through a loud speaker, a tube voltameter or a registration instrument. The tube voltameter employed indicated a level of disturbance of 2–4 mv. At the point where the gap was situated, it gave a deflection indicating 8 mv.

The experiment was varied by introducing a wedge shaped laminated soft iron core of 2 cm. diameter between the two permanent magnets. This core was placed vertically on the surface of the rail, the edge extending perpendicular to the longitudinal axis of the rail at a distance of 6 mm. Alternating current at 50 cycles per sec. was sent through a coil on the core. This arrangement is passed slowly and uniformly along the iron rail on which the magnetic tape is firmly mounted. If the magnetic tape is now scanned in exactly the same way on the tape recorder, then a loud sound is heard where the area of disturbance was situated. The tube voltameter gives a deflection of 50 mv. The deflection is thus six times as great as when the permanent magnets are used alone. To this is added the fact that the noise level is slightly improved by the alternating field (2 mv.).

We claim:

1. A method of magnetographically testing a permanently magnetizable article for faults, which method includes the steps of magnetizing the article, applying to the article a magnetic recording foil to bring the foil within the magnetic scatter field of any faults that may be in the article, and cooling the foil down from a temperature at least as high as its Curie point to a temperature lower than its Curie point to cause the foil to become magnetized by said scatter field.

2. In the magnetographic method of nondestructively testing magnetizable metal articles by measuring the magnetic scatter field of any fault in said articles with a magnetic recording layer, the improvement according to which the magnetic scatter field is measured with a magnetic recording layer which has a natural coercive force greater than the field strength in the saturation break or knee of the hysteresis loop of the metal article tested but the magnetic recording layer is heated to or above its Curie temperature and then cooled to below that temperature in the magnetic scatter field of the metal tested.

(References on following page)

References Cited

UNITED STATES PATENTS

| | | | |
|---|---|---|---|
| 2,764,733 | 9/1956 | De Forest | 324—38 |
| 2,979,655 | 4/1961 | De Forest | 324—34 |
| 3,341,771 | 9/1967 | Crouch et al. | 324—38 |

FOREIGN PATENTS

| | | |
|---|---|---|
| 660,323 | 8/1965 | Belgium. |

RUDOLPH V. ROLINEC, *Primary Examiner.*

R. J. CORCORAN, *Assistant Examiner.*